United States Patent
Ulber et al.

(10) Patent No.: US 10,486,968 B2
(45) Date of Patent: Nov. 26, 2019

(54) PLANT FOR PRODUCTION OF HYDROGEN AND METHOD FOR OPERATING THIS PLANT

(71) Applicant: L'Air Liquide, Societe Anonyme pour l'Etude et l'Exploitation des Procedes Georges Claude, Paris (FR)

(72) Inventors: Dieter Ulber, Steinbach (DE); Alexander Rosch, Katy, TX (US); Ahmet Sari, Sulzbach (DE); Jan Cobbaut, Brussels (BE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 8 days.

(21) Appl. No.: 15/524,006

(22) PCT Filed: Nov. 9, 2015

(86) PCT No.: PCT/EP2015/025077
§ 371 (c)(1),
(2) Date: May 3, 2017

(87) PCT Pub. No.: WO2016/078775
PCT Pub. Date: May 26, 2016

(65) Prior Publication Data
US 2017/0334719 A1 Nov. 23, 2017

(30) Foreign Application Priority Data
Nov. 18, 2014 (DE) .......................... 10 2014 116 871

(51) Int. Cl.
*C01B 3/56* (2006.01)
*C01B 3/38* (2006.01)
(Continued)

(52) U.S. Cl.
CPC .............. *C01B 3/56* (2013.01); *B01D 53/047* (2013.01); *B01D 53/0462* (2013.01);
(Continued)

(58) Field of Classification Search
None
See application file for complete search history.

(56) References Cited

U.S. PATENT DOCUMENTS

| | | | |
|---|---|---|---|
| 2,667,410 A | 1/1954 | Pierce | |
| 8,535,638 B2 * | 9/2013 | Terrien | ................. B01D 53/002 252/373 |

(Continued)

FOREIGN PATENT DOCUMENTS

| | | |
|---|---|---|
| EP | 2 420 473 | 2/2012 |
| WO | WO 2007/068682 | 6/2007 |

OTHER PUBLICATIONS

International Search Report and Written Opinion for PCT/EP2015/025077, dated Feb. 15, 2016.

*Primary Examiner* — Anthony J Zimmer
(74) *Attorney, Agent, or Firm* — Justin K. Murray

(57) ABSTRACT

The invention relates to a plant for production of hydrogen, and to a method for operating this plant, comprising a steam reforming reactor having a furnace, in which reactor water and at least one carbonaceous energy carrier are reacted to form a hydrogen-containing crude synthesis gas, and at least one cleaning device for purifying the crude synthesis gas, to which the crude synthesis gas is fed from the steam reforming via at least one feed line. According to the invention, upstream of one of the at least one cleaning devices at least one return line branches off from the feed line, through which the crude synthesis gas is at least in part recirculated into the furnace of the steam reforming reactor.

4 Claims, 2 Drawing Sheets

(51) Int. Cl.
  *B01D 53/04* (2006.01)
  *B01D 53/047* (2006.01)
  *B01D 53/14* (2006.01)
  *B01J 19/00* (2006.01)
  *C01B 3/52* (2006.01)

(52) U.S. Cl.
  CPC ...... *B01D 53/1475* (2013.01); *B01J 19/0013* (2013.01); *C01B 3/384* (2013.01); *C01B 3/52* (2013.01); *B01D 2252/204* (2013.01); *B01D 2253/102* (2013.01); *B01D 2253/108* (2013.01); *B01D 2256/16* (2013.01); *B01D 2257/502* (2013.01); *B01D 2257/504* (2013.01); *B01D 2257/80* (2013.01); *B01J 2219/00157* (2013.01); *C01B 2203/0233* (2013.01); *C01B 2203/04* (2013.01); *C01B 2203/042* (2013.01); *C01B 2203/043* (2013.01); *C01B 2203/047* (2013.01); *C01B 2203/0415* (2013.01); *C01B 2203/0475* (2013.01); *C01B 2203/0495* (2013.01); *C01B 2203/0811* (2013.01); *C01B 2203/0816* (2013.01); *C01B 2203/0822* (2013.01); *C01B 2203/0827* (2013.01); *C01B 2203/146* (2013.01); *C01B 2203/147* (2013.01); *C01B 2203/1604* (2013.01); *C01B 2203/1695* (2013.01); *Y02C 10/08* (2013.01); *Y02P 20/128* (2015.11)

(56) References Cited

U.S. PATENT DOCUMENTS

| | | |
|---|---|---|
| 2003/0170510 A1 | 9/2003 | Robb et al. |
| 2006/0179718 A1* | 8/2006 | Whyatt ................. B01F 5/0604 48/198.7 |
| 2009/0092883 A1 | 4/2009 | Ozeki et al. |
| 2010/0068573 A1 | 3/2010 | Tamura et al. |
| 2010/0255432 A1 | 10/2010 | Fuentes et al. |
| 2012/0064421 A1* | 3/2012 | Tamura ................... C01B 3/323 429/423 |
| 2013/0009102 A1* | 1/2013 | Kelly ..................... C01B 3/384 252/373 |

* cited by examiner

PLANT FOR PRODUCTION OF HYDROGEN AND METHOD FOR OPERATING THIS PLANT

CROSS REFERENCE TO RELATED APPLICATIONS

This application is a § 371 of International PCT Application PCT/EP2015/025077, filed Nov. 9, 2015, which claims the benefit of DE 10 2014 116 871.2, filed Nov. 18, 2014, both of which are herein incorporated by reference in their entireties.

FIELD OF THE INVENTION

The invention relates to a plant for production of hydrogen comprising a steam reforming reactor having a furnace, in which reactor water and at least one carbonaceous energy carrier are reacted to form a hydrogen-containing crude synthesis gas, and at least one cleaning device for purifying the crude synthesis gas, to which cleaning device the crude synthesis gas is fed from the steam reforming via at least one feed line. The invention also additionally comprises a method for operating this plant.

BACKGROUND

All hydrogen-containing gas mixtures that can be used as starting materials of a synthesis reaction are in principle termed synthesis gas. Typical syntheses for which the synthesis gas is used are the syntheses of methanol and ammonia. The breakdown of the synthesis gas into the individual components CO, $H_2$, $CO_2$, $H_2O$ and $CH_4$ likewise forms a broad field of application for reforming plants.

The production of synthesis gas can in principle proceed from solid, liquid and gaseous starting materials. The most important method for generating synthesis gas from gaseous reagents, what is termed reforming, generally utilizes natural gas as reagent. Natural gas is substantially a mixture of gaseous hydrocarbons, the composition of which varies depending on the site of origin, where the main component is always methane ($CH_4$) and, as further components, higher hydrocarbons having two or more carbon atoms and also impurities such as sulphur, for example, can be present.

To reform natural gas to form a synthesis gas, what is termed steam reforming is principally used, in which the methane that is present is converted in the presence of a catalyst primarily according to the following reaction equations to form hydrogen ($H_2$), carbon monoxide (CO) and carbon dioxide ($CO_2$):

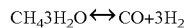

$$CH_4 + H_2O \leftrightarrow CO + 3H_2$$

and

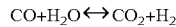

$$CO + H_2O \leftrightarrow CO_2 + H_2$$

When a suitable catalyst is used, and steam is added, moreover, cleavage of higher hydrocarbons to form methane occurs according to what is termed the rich gas reaction:

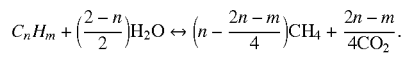

$$C_nH_m + \left(\frac{2-n}{2}\right)H_2O \leftrightarrow \left(n - \frac{2n-m}{4}\right)CH_4 + \frac{2n-m}{4}CO_2.$$

The highly endothermic character of the methane conversion with water to form carbon monoxide dominates the overall enthalpy of steam reforming. The energy input necessary for this process, which is therefore endothermic overall, is generally realized via an external heater, what is termed the furnace. For this purpose, the overall stream of the carbonaceous energy carrier is divided and the first part is introduced as reagent into the steam reforming, while the second part is fed as fuel gas into the furnace. In principle, also, different carbonaceous energy carriers can be fed into the steam reforming and into the furnace.

The methane conversion can be increased by increasing the steam-carbon ratio, i.e. by superstoichiometric addition of steam.

The subsequent purification with synthesis gas is dependent on the composition of the synthesis gas. If the synthesis gas contains hydrogen which is to be used further in downstream processes, then, to purify the hydrogen, pressure-swing adsorption (frequently also PSA) is usually carried out.

Pressure-swing adsorption (PSA) is a physical method for separating gas mixtures under pressure by means of adsorption. Special porous materials such as, for example, zeolites or activated carbon are used here as adsorbents. The gas is introduced at an elevated pressure of 10 to 80 bar into a fixed-bed reactor, which is filled with the adsorbents, and so the gas flows through the fixed bed. One or more components of the mixture, termed the heavy components, are then adsorbed. At the exit of the bed, what is termed the light component, in this case hydrogen, can be taken off. After some time, the adsorber bed is substantially saturated, and some of the heavy components co-exit. At this time, via valves, the process is switched over in such a manner that the exit for the light component is closed and an outlet for the heavy components is opened. This is accompanied by a pressure fall. Via the low pressure, then, the adsorbed gas is desorbed again and can be taken off at the outlet. Generally, two alternately loaded and discharged adsorbers are connected, and so continuous operation is possible.

If the synthesis gas also contains carbon monoxide, the purification generally additionally comprises a $CO_2$ removal, a synthesis gas drying unit and a low-temperature synthesis gas separation plant or cryogenic synthesis gas separation plant (CO Cold Box).

The $CO_2$ removal is usually a scrubber in which amines or else carbonates are used as scrubbing medium. In this case, in a first step, the $CO_2$ accumulates in the scrubbing medium and can then, together with the scrubbing medium, be transferred to a second separation step. In the second step, scrubbing medium and $CO_2$ are separated again from one another, whereby the $CO_2$ can be taken off in concentrated form.

In the drying, water still originating from the steam reforming is removed from the synthesis gas. The drying unit is usually a temperature-swing adsorption unit (TSA).

In the low-temperature separation plant, the CO gas is separated off from the other components still present in the synthesis gas.

In addition to the CO gas, in the low-temperature separation plant, a hydrogen-rich stream and one or more residual gas streams are generated. For purifying the hydrogen-rich streams, a pressure-swing adsorption is usually used, which separates off the hydrogen from what is termed the PSA residual gas.

In accordance with the possible connection variants of the individual purification stages, the residual gas contains unreacted methane, higher-value hydrocarbons, $CO_2$, $H_2O$, inert gases, such as nitrogen and argon, and also unseparated hydrogen.

The residual gas is recirculated to the furnace of the endothermic steam reforming. The amount of additional fuel gas required can therefore be reduced, since the residual gas usually possesses a not insignificant heating value. Furthermore, in this manner the residual gas need not be worked up further or burnt in a flare.

U.S. Pat. No. 2,667,410 describes a method for controlling the quality of the synthesis gas generated from a steam reforming process, with the focus on the residual gas formed in the purification. In this case, by measuring the unreacted methane and the reaction temperature, the amount of the methane supplied is adjusted in such a manner that the synthesis gas formed always has the same composition, which is necessary for the downstream ammonia synthesis.

US 2010/0255432 A1 discloses a method for starting up a steam reforming reactor, in which a mixture of a fuel gas and an inert gas is generated which has a composition such that the heating output corresponds to 25% of the heating output in the steady-state operation with recirculation of a residual gas. The oven of the steam reformer is operated during startup using this mixture.

A problem with the recirculation of residual gas is that with the cleaning devices, malfunctions can always occur. The steam reforming reactor, however, is very sensitive to pressure fluctuations in the furnace chamber. The control range is usually at a slight under pressure of from −1 to −10 mm of water. In the event of malfunction of one of the gas cleaning processes, the malfunctioning cleaning stage and also possibly all subsequent cleaning stages must be turned off immediately. Usually, then, the crude synthesis gas is simply burnt in a flare. Owing to the loss of the residual gas, when one or more cleaning stages are switched off, the total amount of fuel gas introduced into the furnace falls, this gas being composed of fuel gas and recirculated residual gas during standard operation. This leads to a reduced pressure in the combustion chamber, as a result of which emergency shutdown of the entire reformer plant may occur.

A problem here is that in the event of malfunction of the entire steam reforming, idle times of 24 hours and more occur. This far exceeds the idle times which are necessary for the renewed startup of the cleaning stages (for example low-temperature synthesis gas separation plant 4 to 8 hours, $CO_2$ scrubbing 1-3 hours, pressure-swing adsorption 1 to 3 hours). Therefore, it is absolutely necessary to avoid the entire process being switched off owing to loss of one of the recirculating streams from one of the cleaning plants.

The problem of sudden pressure fall in the event of loss of a residual gas originating from the purification has in practice to date been generally solved in that a false air flap is opened on the steam reformer furnace, through which false air is drawn into the furnace.

A disadvantage with this procedure, however, is that by drawing in of cold ambient air, the temperature in the furnace chamber and flue gas waste-heat system falls greatly. Therefore, considerable temperature fluctuations can occur on the furnace side and process side of the reformer furnace, for which reason the reforming process must then finally be switched off anyway.

SUMMARY OF THE INVENTION

It is therefore an object of the present invention to provide a plant with which, even in the event of faults in a cleaning device connected downstream of the steam reforming reactor, the operation of the steam reforming reactor can continue to be maintained.

This object is achieved by a method and a plant having the features of the various embodiments described herein. In one embodiment, a plant of this kind has a steam reforming reactor in which water and a carbonaceous energy carrier, preferably a gas consisting of at least 80% by weight of methane, are reacted to form a hydrogen-containing crude synthesis gas. This reaction proceeds endothermically, for which reason the steam reforming reactor is equipped with a furnace, into which at least one heating agent, preferably a combustible gas (also termed fuel gas), is introduced and burnt there. The resultant heat provides the heat required for the steam reforming reaction. In addition, this plant comprises at least one cleaning device, in which at least one component present in the crude synthesis gas, for example hydrogen, is purified.

Finally, such a device comprises a return line, through which the crude synthesis gas can at least in part be recirculated into the furnace of the steam reforming reactor before passage through at least one cleaning stage.

Preferably, in the at least one cleaning appliance, residual gas is separated off that is at least in part combustible. In order to utilize the calorific value of this residual gas, the residual gas can be recirculated via a line into the furnace. If this cleaning device then malfunctions, the residual gas that is recirculated into the furnace is also absent. Through the recycling according to the invention, it is now possible to replace this residual gas, in that a part of the crude synthesis gas is branched off upstream of the cleaning stage and is recirculated to the furnace.

The crude synthesis gas, for the purposes of the invention, is taken to mean here the hydrogen-containing gas originating from the steam reforming reactor that has not yet passed through all of the cleaning stages present, i.e. including a partially cleaned gas.

The residual gas composition varies in accordance with the cleaning process used and usually has the following composition in the stated ranges:

| Gas | minimum | maximum |
|---|---|---|
| $H_2$ (mol %) | 80 | 92 |
| CO (mol %) | 2 | 6 |
| $CO_2$ (mol %) | 0 | 1 |
| $H_2O$ (mol %) | 0 | 2 |
| $N_2$ (mol %) | 0 | 1 |
| $CH_4$ (mol %) | 6 | 10 |

If a plurality of cleaning devices are used, they are preferably connected in series in order to work up the entire gas stream.

Preferably, one cleaning device, particularly preferably the last series-connected cleaning device, is a pressure-swing adsorption. In the pressure-swing adsorption, the residual gas is separated off from the hydrogen. Expediently, this residual gas is then recirculated to the furnace of the steam reforming reactor and will there in part replace the fuel gas. As a result, the energy efficiency of the method can be significantly increased.

In an embodiment of the invention, in the steam reforming reactor the at least one carbonaceous energy carrier, which preferably consists of at least 80% by weight of methane, is reacted together with water to give a synthesis gas containing carbon monoxide and hydrogen. Such a reaction has the advantage that the carbon atoms present in the energy carrier need not be discharged from the system in the form of $CO_2$, but rather are likewise a valuable product (CO). Carbon monoxide and hydrogen are substantial primary products of the chemical industry and are required, for example, as reagents for methanol synthesis. Olefins can then be generated therefrom, in the course of a methanol-to-olefin method, for example, as important building blocks for generating longer-chain molecules.

The device according to the invention in addition expediently has further cleaning devices, preferably a $CO_2$ removal, a drying and/or a cold chamber. By means of these additional cleaning devices, in particular in the generation of a synthesis gas that contains not only hydrogen but also carbon monoxide, all valuable products ($CO$, $H_2$) can be separated off in high purity. Preferably, these further cleaning devices are interconnected in the sequence $CO_2$ removal, drying and/or cold chamber. Such an interconnection is logical, in particular in the case of a method generating carbon monoxide and hydrogen, in order to be able to purify both valuable products sufficiently. Depending on the composition of the synthesis gas and the product variety sought, however, other interconnections are also conceivable.

Preferably, in each case, at least one further return line branches off from such further cleaning devices, and recirculates streams produced in the cleaning back into the furnace of the steam reforming reactor.

Particularly expedient, in this case, is a line guidance which, in addition, has a return line upstream of each feed line to the respective cleaning stage, wherein the return line leads back into the furnace of the steam reforming reactor. Thus, in the event of malfunction of each individual cleaning stage, the synthesis gas can be recirculated at least in part to the furnace and there replace the unavailable residual gas from the pressure-swing adsorption. Thus it is possible to react flexibly to malfunction of each cleaning stage, to shut them down separately and start them up again as fast as possible, and the steam reforming reaction can continue as such under standard conditions.

The brief further operation of the steam reforming plant without yielding product, with further use of the carbonaceous energy carrier, is more expedient from an economic aspect than the shutting down and restarting of the plant.

Preferably, a metering device is provided in at least one return line, preferably a rate control valve with flow metering, which meters the rate of the recirculated crude synthesis gas. In this manner it is possible to prevent too much or too little hydrogen passing back into the steam reforming reactor. Such a scenario might have effects which include subjecting the steam reforming reaction to severe fluctuations, or might even make a shutdown necessary.

In a further embodiment of the invention, in addition, at least one measuring device is provided which determines the volume flow rate of the carbonaceous energy carrier into the furnace of the steam reforming reactor. Such a value permits the additional demand for recirculated crude synthesis gas to be determined, and so this value can be controlled continuously or else selected once.

The amount of recirculated crude synthesis gas is determined as the theoretical value $V_{S1}$, where the theoretical value of the volume of the recirculated synthesis gas $V_{S1}$ is calculated from:

$$V_{S1} = V_m + \frac{F \cdot V_G \cdot H_{i(G)} \cdot \eta_G}{H_{i(S)} \cdot \eta_S}$$

where

| | | |
|---|---|---|
| $V_S$ | Theoretical volume flow rate of the recirculated crude synthesis gas | m³ s⁻¹ |
| $V_m$ | Actual volume flow rate of the recirculated residual gas from at least one cleaning device | m³ s⁻¹ |
| $V_G$ | Volume flow rate of the carbonaceous energy carrier fed into the furnace averaged over the last three minutes | m³ s⁻¹ |
| F | Furnace factor | — |
| $H_{i(G)}$ | Heating value of the carbonaceous energy carrier | J/kg |
| $H_{i(S)}$ | Heating value of the crude synthesis gas | J/kg |
| $\eta_G$ | Efficiency value of the carbonaceous energy carrier | — |
| $\eta_S$ | Efficiency value of the crude synthesis gas | — | where F has a value between 0.7 and 1.2, preferably 0.9 and 1.

The volume flow rate $V_m$ of the recirculated crude synthesis gas is the measured volume flow rate at the respective time point.

Preferably, there is in addition a feed line for an oxygen-containing gas into the furnace of the steam reforming reactor, since oxygen is required as a reaction partner for the combustion that is proceeding.

In this feed line there is expediently situated likewise a measuring device that determines the volume inflow rate of the oxygen-containing gas in such a manner that the amount of oxygen available in total can be calculated and likewise can be used as a factor for the crude synthesis gas recirculation under closed-loop or open-loop control.

In this embodiment it has proved logical to recirculate the crude synthesis gas in the amount of a theoretical value $V_{S2}$ which is determined as:

$$V_{S2} = \frac{V_L}{a}$$

where

| | | |
|---|---|---|
| $V_{S2}$ | Theoretical volume flow rate of the recirculated crude synthesis gas | m³ s⁻¹ |
| $V_L$ | Volume flow rate of the air | m³ s⁻¹ |
| a | Correction factor | — | where a has a value between 1.05 and 1.15.

As $V_L$, instead of the volume flow rate of the air (=combustion air), also, in general, the volume flow rate of an oxygen-containing gas can be adopted. When other gases are used, the same formula is to be employed.

Particularly expedient is an embodiment of the plant according to the invention which has devices for measuring the values necessary for calculating $V_{S1}$ and $V_{S2}$, and a metering device which is constructed in such a manner that it recirculates residual gas to the furnace in the amount of the smaller of the two values $V_{S1}$ and $V_{S2}$.

Finally, the invention also comprises a method for operating the plant for production of hydrogen, wherein water and at least one carbonaceous energy carrier are reacted in a first method step in a steam reforming reaction to form a crude synthesis gas, and in a second method step the crude synthesis gas is purified in a pressure-swing adsorption. The crude synthesis gas is at least in part recirculated into the furnace of the steam reforming reaction before passing through the pressure-swing adsorption.

Preferably, the amount of the recirculated crude synthesis gas is calculated as theoretical value $V_{S1}$, where the theoretical value of the volume of the recirculated synthesis gas $V_{S1}$ is determined as:

$$V_{S1} = V_m + \frac{F \cdot V_G \cdot H_{i(G)} \cdot \eta_G}{H_{i(S)} \cdot \eta_S}$$

where

| | | |
|---|---|---|
| $V_S$ | Theoretical volume flow rate of the recirculated crude synthesis gas | m³ s⁻¹ |
| $V_m$ | Actual volume flow rate of the recirculated residual gas from at least one cleaning device | m³ s⁻¹ |
| $V_G$ | Volume flow rate of the carbonaceous energy carrier fed into the furnace averaged over the last three minutes | m³ s⁻¹ |
| F | Furnace factor | — |
| $H_{i(G)}$ | Heating value of the carbonaceous energy carrier | J/kg |
| $H_{i(S)}$ | Heating value of the crude synthesis gas | J/kg |
| $\eta_G$ | Efficiency value of the carbonaceous energy carrier | — |
| $\eta_S$ | Efficiency value of the crude synthesis gas | — | where F has a value between 0.7 and 1.2, preferably 0.9 and 1.

Underlying this calculation is the concept of calculating, via the heating value, the amount of the residual gas recirculated to date from the pressure-swing adsorption and of recirculating crude synthesis gas having the same heating value. As a result, temperature drops and reaction conditions altered thereby in the steam reforming reaction, or stopping of the reaction, can be reliably avoided.

If there are fluctuations in the gas quality of the gas that is used as fuel gas in the furnace and as reagent in the steam reforming, then the composition of the residual gas recirculated from the pressure-swing adsorption can also alter greatly. Usually, such fluctuations are reacted to by controlling the feed of the fuel gas appropriately.

It has proved to be logical to recirculate the crude synthesis gas in the amount of a theoretical value $V_{S2}$ which is determined as:

$$V_{S2} = \frac{V_L}{a}$$

where

| | | |
|---|---|---|
| $V_{S2}$ | Theoretical volume flow rate of the recirculated crude synthesis gas | m³ s⁻¹ |
| $V_L$ | Volume flow rate of the air | m³ s⁻¹ |
| a | Correction factor | — | wherein a has a value between 1.05 and 1.15. This ensures that sufficient oxygen is present in order to convert the recirculated crude synthesis gas. Otherwise, there would be a concentration of the at least partially combustible residues which are a problem in plant operation.

It has proved to be particularly convenient here not only to calculate the requirement for recirculated synthesis gas on the basis of the required heating value, but also to determine the maximum possible recycling rate on the basis of the oxygen amount fed in, and then to determine the amount of the actually recirculated crude synthesis gas in accordance with the smaller theoretical value of these two modes of calculation. In this manner, the greatest possible requirement of additional heating value can be covered without lack of reaction on account of an oxygen deficit.

It has proved to be logical to select the amount of the recirculated synthesis gas in a ramp, preferably a linear ramp, in order to avoid in this manner abrupt changes in the process procedure of the steam reforming reactor. The ramping is particularly expedient when the recirculation of the residual gas is likewise reduced in a ramp-like manner, in such a manner that the ramp with which the theoretical value of the recirculated synthesis gas is selected runs reciprocally to the ramp for shutting down the recirculated residual gas.

Usually, such ramps are run over a short and limited time interval (for example 40 seconds), since this gives the advantage of achieving the target value promptly and nevertheless not risking abrupt changes in the process conditions.

After a single calculation of the theoretical value $V_{S1}$ or $V_{S2}$ of the recirculated volume flow rate of the recirculated synthesis gas, this can either be calculated further continuously on the basis of the air quantity, or else the value calculated once is, after completion of the ramp, particularly preferably, after completion of 40 seconds, set as a fixed control value.

In addition, the invention also comprises that the method is carried out during startup or during the malfunction of at least one of the downstream cleaning devices. During startup, significant savings are made in this manner of the carbonaceous energy carrier used, the fuel gas or primary energy carrier, or, during malfunction of one of the downstream cleaning stages, as described, the operation of the steam reforming reactor can be maintained unchanged.

The invention finally also comprises the use of a plant according to the invention in the case of malfunction of one of the downstream cleaning stages. As already described, in this manner it is possible to react to faults without the steam reforming reactor needing to be shut down on account of pressure drops, and very long and very expensive idle times of the plant occurring.

According to the invention, this plant can also be used during the startup of a plant for producing hydrogen, since here the steam reforming reactor is started first. Subsequently, all cleaning stages provided are successively turned on in the sequence of their interconnection. As a result, considerable amounts of fuel gas can be saved, since the crude synthesis gas obtained can replace at least in part the carbonaceous energy carrier. The startup operation is thereby arranged in a considerably more cost-favourable manner, since there are still no residual gases available from the cleaning processes.

An example of the generation of pure hydrogen shows that, generally, during the commissioning of the pressure-swing adsorption, all of the crude synthesis gas produced must be flared off over a period of 1 to 5 hours. The synthesis gas generation at this time point runs at about 40% of nominal load.

An example of the generation of pure carbon monoxide shows that, generally, during the commissioning of the low-temperature synthesis gas separation plant, in standard operation, the synthesis gas produced must be flared off over the period of up to 12 hours. By recycling synthesis gas, here, correspondingly, much fuel gas can be saved. The synthesis gas generation at this time point runs at about 40% of nominal load.

BRIEF DESCRIPTION OF THE DRAWINGS

Further features, advantages and possible applications of the invention result from the subsequent description of the drawings and the exemplary embodiments. In this case, all described and/or pictorially presented features, alone or in any combination, are the subject matter of the invention, independently of the summary thereof in the claims and the dependency reference thereof.

DETAILED DESCRIPTION OF THE INVENTION

Figure 1:
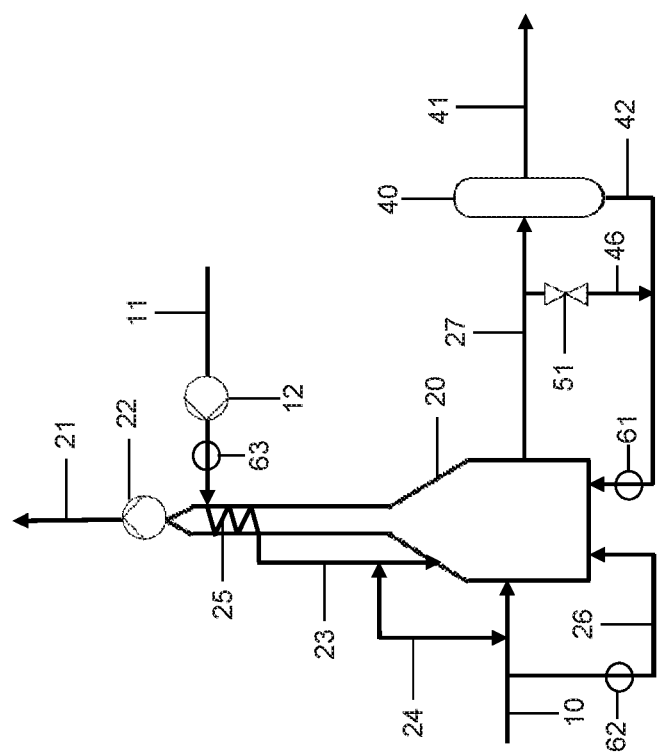
FIG. 1 shows a plant according to the invention for production of hydrogen.

FIG. 1 shows a steam reforming reactor 20, into which, firstly, via line 10, a carbonaceous energy carrier, preferably a gas consisting of at least 80% by weight of methane, is fed. Via line 26, as also via line 24, parts of this energy carrier are branched off and introduced as fuel gas into the furnace of the steam reforming reactor 20.

Via line 21 and a compressor or a blower 22, flue gas is withdrawn from the furnace chamber of the steam reforming reactor 20 and in this case, simultaneously, the pressure in the furnace chamber is controlled.

Via line 11 and a compressor or a blower 12, in addition, air is introduced into the system. Expediently, as shown, the air is first passed through a heat exchanger 25 in the flue gas waste-heat system of the steam reforming reactor and in this manner takes up heat from the exhaust gas escaping from the steam reforming reactor 20 before it passes preheated into line 23. From line 23, then, the air is fed into the actual steam reforming reactor 20.

Via line 27, the resultant crude synthesis gas is withdrawn from the steam reforming reactor 20 and passed into a pressure-swing adsorption 40. There, hydrogen is obtained having a degree of purity of 99 mol %, preferably 99.9 mol %, particularly preferably 99.99 mol %, and withdrawn via line 41. The residual gas from the pressure-swing adsorption is recirculated via line 42 to the furnace of the steam reforming reactor 20.

Via line 46, crude synthesis gas can be branched off before passing through the pressure-swing adsorption 40 and conducted into the furnace of the steam reforming reactor 20. In this case, the line 46 can open out into the return line 42, or else directly into the furnace of the steam reforming reactor 20.

Figure 2:
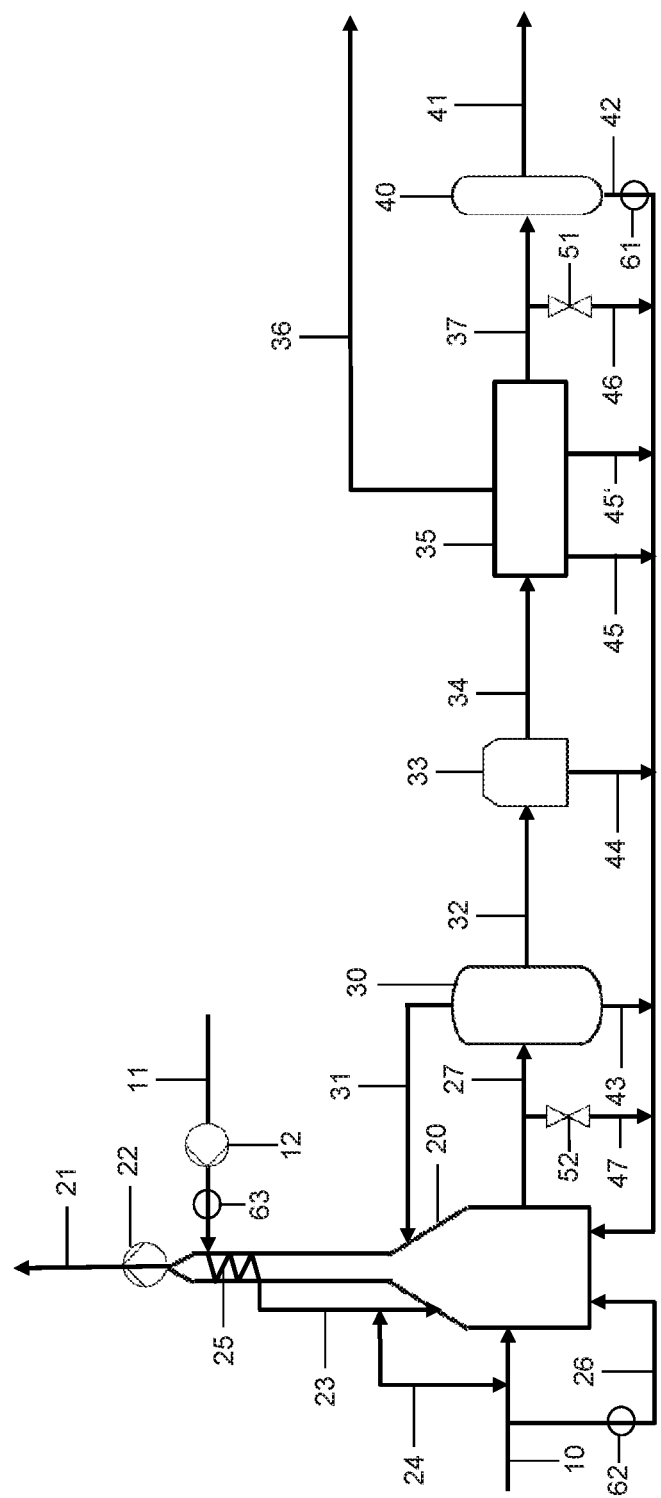
FIG. 2 shows a plant according to the invention for production of hydrogen and carbon monoxide.

FIG. 2 represents the plant according to the invention for generating carbon monoxide and hydrogen. The carbonaceous energy carrier is fed in via line 10, from which, via line 26, parts of the fuel gas are introduced into the furnace of the steam reforming reactor 20. The gas used as carbonaceous energy carrier contains at least 80% by weight of methane.

Air for the combustion is fed into the furnace of the steam reforming reactor 20 via line 11 and the one compressor or a blower 12. Preferably, in this case, the air in the stack of the steam reforming reactor 20 is passed via a heat exchanger 25 and then, via line 23, is fed into the furnace of the steam reforming reactor 20.

The crude synthesis gas generated in the steam reforming 20 is fed via line 27 to a $CO_2$ scrubber 30. The $CO_2$ that is separated off here is recirculated via line 31 to the steam reforming 20 in order here to be further converted at least in part to carbon monoxide in a CO-shift reaction.

The purified crude synthesis gas is fed via line 32 to a dryer 33 in which water still originating from the steam reforming is removed.

The crude synthesis gas then passes via line 34 into a low-temperature synthesis gas separation plant 35 in which it is separated into a hydrogen-rich gas 37, the carbon monoxide 36 and various residual gas streams 45. The hydrogen-rich gas is fed via line 37 to the pressure-swing adsorption 40 in which the hydrogen product is removed via line 41. The various cleaning processes are designed in a form such that the required degrees of product purity are reliably achieved.

Residual gas then passes back via return line 42 into the furnace of the steam reforming oven.

In addition, return lines 43, 44, 45 and 45' branch off from the respective cleaning stages 30, 33 and 35, in such a manner that, via the return lines 45 and 45' from the low-temperature synthesis gas separation plant 35, via the return line 44 from the dryer and the return line 43 from the $CO_2$ scrubber 30, also in each case crude synthesis gas can be branched off and transferred to the return line 42 through which it then passes into the furnace of the steam reformer.

The recirculation of the various fuel gases 24, 26, 42, 44, 45, 45', 46, 47 to the burner of the steam reforming reactor 20 need not necessarily take place in a shared collecting line, but can also be implemented separately. This could proceed, for example, by means of two different collections at a different pressure level.

Via return line 47, the crude synthesis gas can also be recirculated to the furnace of the steam reformer even before passing through any of the cleaning devices 30, 33, 35, 40. Therefore, in the event of malfunction of any cleaning stage, the crude synthesis gas can be tapped and recirculated to the furnace, in such a manner that the amount of energy fed to the furnace and also the gas stream fed remain constant and no fluctuations in the steam reformer itself occur.

As a result, long idle times in the event of malfunction of one of the downstream cleaning stages can be reliably prevented. Furthermore, during startup, the cleaning stages can be switched on stepwise and a recycling of gas into the furnace of the steam reformer can already be switched on before the complete plant is running. As a result, considerable amounts of the carbonaceous energy carrier can be saved, which must otherwise be used for the furnace.

Furthermore, measuring devices are situated in the lines 11, 26 and 42 in order to determine the respective volume streams of the gases flowing through these lines 11, 36 and 42. In detail, in this case, the volume stream of the air fed in through the line 11 is measured using measuring device 63, the volume stream of the residual gas stream recirculated through the line 42 into the furnace of the steam reforming reactor 20 is measured using measuring device 61 and the volume stream of the energy carrier conducted through the line 26 into the furnace of the steam reforming reactor 20 is measured using measuring device 62. Suitable measuring devices are, in particular, turbine meters, rotating-vane meters, direct displacement meters, Pitot tubes, coriolis meters and ultrasonic flow metering methods.

On the basis of these values, in the manner shown the theoretical value for the volume of the crude synthesis gas stream recirculated via line 46 and/or 47 can be calculated. This theoretical value is under closed-loop or open-loop control via the metering device 51, preferably a valve, in return line 46 and the metering device 52, preferably a valve, in return line 47. Here, metering devices having integrated mass flow or volume stream measurement can also be used.

Exemplary Embodiments

Table 1 shows the composition of the volume stream in the respective lines for a plant constructed according to the invention according to FIG. 1 for production of hydrogen in mol %.

Table 2 shows the composition of the volume stream in the respective lines for a plant constructed according to the invention according to FIG. 2 for production of hydrogen and carbon monoxide in mol %.

TABLE 1

Stream compositions in the lines of a structure according to the invention for production of hydrogen.

| Line | 10 | 11 | 21 | 23 | 26 | 27 (1) | 41 | 42 | 46 |
|---|---|---|---|---|---|---|---|---|---|
| $H_2$ (mol %) | 0 | 0 | 0 | 0 | 0 | 75.08 | 100 | 26.58 | 98.43 |
| CO (mol %) | 0 | 0 | 0 | 0 | 0 | 4.45 | 0 | 13.13 | 0.46 |
| $CO_2$ (mol %) | 1.1 | 0.03 | 19.73 | 0.03 | 1.1 | 16.1 | 0 | 47.42 | 0.01 |
| $H_2O$ (mol %) | 0 | 0.959 | 17.56 | 0.959 | 0 | 0.306 | 0 | 0.904 | 0.09 |
| $N_2$ (mol %) | 2 | 77.36 | 60.79 | 77.36 | 2 | 0.442 | 0.005 | 1.296 | 0.06 |
| $O_2$ (mol %) | 0 | 20.73 | 1.2 | 20.73 | 0 | 0 | 0 | 0 | 0.00 |
| $CH_4$ (mol %) | 89 | 0 | 0 | 0 | 89 | 3.618 | 0 | 10.67 | 1.17 |
| Remainder (mol %) | 7.7 | 0.925 | 0.722 | 0.925 | 7.7 | 0 | 0 | 0 | 0 |

(1) Dry, after condensate deposition

TABLE 2

Stream compositions in the lines of a structure according to the invention for production of hydrogen and carbon monoxide.

| Line | 10 | 11 | 21 | 23 | 26 | 27 (1) | 32 | 36 |
|---|---|---|---|---|---|---|---|---|
| $H_2$ (mol %) | 0 | 0 | 0 | 0 | 0 | 65.8 | 70.8 | 0 |
| CO (mol %) | 0 | 0 | 0 | 0 | 0 | 21.4 | 23 | 99 |
| $CO_2$ (mol %) | 0.1 | 7.25 | 7.25 | 7.25 | 0.1 | 6.97 | 0 | 0 |
| $H_2O$ (mol %) | 0 | 22 | 22 | 22 | 0 | 0.35 | 0.2 | 0 |
| $N_2$ (mol %) | 0.9 | 68.6 | 68.6 | 68.6 | 0.9 | 0.22 | 0.25 | 0.6 |
| $O_2$ (mol %) | 0 | 1.33 | 1.33 | 1.33 | 0 | 0 | 0 | 0 |
| $CH_4$ (mol %) | 98 | 0 | 0 | 0 | 98 | 5.29 | 5.7 | 0 |
| Remainder (mol %) | 1.3 | 0.8 | 0.8 | 0.8 | 1.3 | 0 | 0 | 0 |

| Line | 37 | 41 | 42 | 43 | 44 | 45 | 45' | 47 |
|---|---|---|---|---|---|---|---|---|
| $H_2$ (mol %) | 97.9 | 99.997 | 86.3 | 11.3 | 1.67 | 0 | 84.3 | 51 |
| CO (mol %) | 0.59 | 0.0001 | 3.91 | 3.3 | 69.8 | 0 | 10.1 | 3.75 |
| $CO_2$ (mol %) | 0.01 | 0 | 0.04 | 66.9 | 0 | 0 | 0 | 0.04 |
| $H_2O$ (mol %) | 0.15 | 0 | 1 | 17.4 | 0 | 0 | 0 | 0.7 |
| $N_2$ (mol %) | 0.05 | 0.003 | 0.33 | 0.02 | 28.5 | 0 | 0.22 | 1.8 |
| $O_2$ (mol %) | 0 | 0 | 0 | 0 | 0 | 0 | 0 | 0 |
| $CH_4$ (mol %) | 1.27 | 0.0001 | 8.43 | 1.14 | 0 | 100 | 5.36 | 42.5 |
| Remainder (mol %) | 0 | 0 | 0 | 0 | 0 | 0 | 0.01 | 0.2 |

(1) Dry, after condensate deposition

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE SIGNS

10, 11 Line
12 Pump
20 Steam reforming reactor with furnace

21 Line
22 Compressor
23, 24 Line
25 Heat exchanger
26, 27 Line
30 Scrubber
31, 32 Line
33 Dryer
34 Line
35 Low-temperature synthesis gas separation plant
36, 37 Line
40 Pressure-swing adsorption
41 Line
42-47 Return line
51, 52 Metering device
61-63 Measuring device

The invention claimed is:

1. A method for operating a plant for production of synthesis gas, the method comprising the steps of:

reacting water and at least one carbonaceous energy carrier in a steam reforming reactor having a furnace to form a crude synthesis gas, wherein an oxidant is used in combination with a fuel to provide heat for the furnace; and purifying the crude synthesis gas in at least one cleaning stage, wherein the crude synthesis gas is at least in part recirculated into the furnace for use as a supplemental fuel before passing through the at least one cleaning stage, wherein the amount of the crude synthesis gas that is recirculated is based on a calculated theoretical flow rate value.

2. The method according to claim 1, wherein, in the event of changes in the amount of the recirculated synthesis gas, the theoretical flow rate value is selected in a ramp.

3. The method according to claim 1, wherein the method is carried out during the startup of the plant or during the malfunction of at least one of the cleaning stages.

4. The method according to claim 1, wherein the oxidant is air, and wherein the method further comprises the step of measuring a flow rate of the air introduced to the furnace, wherein the theoretical flow rate value of the crude synthesis gas that is recirculated to the furnace is 5 to 15% lower than the measured flow rate of the air introduced to the furnace.

* * * * *